(12) United States Patent
Brown

(10) Patent No.: US 8,402,863 B2
(45) Date of Patent: Mar. 26, 2013

(54) ADJUSTABLE GRIPPING TOOL

(75) Inventor: Daniel P. Brown, Palos Park, IL (US)

(73) Assignee: Loggerhead Tools, LLC, Palos Park, IL (US)

( * ) Notice: Subject to any disclaimer, the term of this patent is extended or adjusted under 35 U.S.C. 154(b) by 457 days.

(21) Appl. No.: 12/576,032

(22) Filed: Oct. 8, 2009

(65) Prior Publication Data

US 2010/0089206 A1   Apr. 15, 2010

Related U.S. Application Data

(63) Continuation-in-part of application No. 11/102,966, filed on Apr. 11, 2005, now Pat. No. 7,992,470, and a continuation-in-part of application No. 10/763,489, filed on Jan. 23, 2004, now Pat. No. 6,889,579.

(51) Int. Cl.
*A47L 11/36* (2006.01)

(52) U.S. Cl. ............................. 81/90.2; 81/90.1; 81/90.3

(58) Field of Classification Search .................. 81/90.1, 81/90.2, 90.3
See application file for complete search history.

(56) References Cited

U.S. PATENT DOCUMENTS

| | | | |
|---|---|---|---|
| 599,837 A | 3/1898 | Harris | |
| 877,773 A | 1/1908 | Holm | |
| 912,117 A | 2/1909 | Green | |
| 1,393,267 A | 10/1921 | Cousins | |
| 1,450,641 A | 4/1923 | Ograbisz | |
| 2,096,016 A | 10/1937 | Weishampel | |
| 2,292,391 A | 8/1942 | Merriman et al. | |
| 2,409,549 A | 10/1946 | Djidics | |
| 2,547,534 A | 4/1951 | Oliver | |
| 2,573,421 A | 10/1951 | Feiring | |
| 2,580,247 A | 12/1951 | Secondi et al. | |
| 2,674,911 A | 4/1954 | Theis | |
| 2,687,661 A | 8/1954 | Richardson | |
| 2,714,827 A | 8/1955 | Kusiv et al. | |
| 2,739,381 A | 3/1956 | Petersen | |
| 2,753,742 A | 7/1956 | Buchanan | |
| 2,787,925 A | * 4/1957 | Buchanan et al. | 72/402 |
| 2,884,826 A | 5/1959 | Bruhn | |
| 2,952,175 A | 9/1960 | Edlen et al. | |
| 2,991,675 A | 7/1961 | Ustin | |
| 3,177,695 A | 4/1965 | Van Oort | |
| 3,199,334 A | 8/1965 | Holmes et al. | |
| 3,226,968 A | 1/1966 | Holmes | |
| 3,624,682 A | 11/1971 | Kowal | |
| 3,664,213 A | 5/1972 | Anati | |
| 3,672,050 A | 6/1972 | Hanback | |
| 3,713,322 A | 1/1973 | Fischer | |

(Continued)

FOREIGN PATENT DOCUMENTS

| | | |
|---|---|---|
| DE | 259320 C | 5/1913 |
| DE | 1452623 A1 | 7/1970 |

(Continued)

OTHER PUBLICATIONS

Examiner's Report dated Nov. 2, 2011 issued in connection with corresponding AU application 2006235501.

(Continued)

*Primary Examiner* — Lee D Wilson
*Assistant Examiner* — Shantese McDonald

(57) ABSTRACT

A self-energizing and de-energizing adjustable gripping tool for engaging a work piece to impart work thereto includes a first element and second element disposed for relative movement. The second element includes an actuation portion having a plurality of slots. The first element includes gripping elements which are each associated with a force transfer element that engages one of the slots such that movement of the second element relative to the first element actuates the gripping elements to engage the work piece.

13 Claims, 5 Drawing Sheets

U.S. PATENT DOCUMENTS

| | | |
|---|---|---|
| 3,901,107 A | 8/1975 | Halls |
| 4,080,733 A | 3/1978 | Clegg |
| 4,112,792 A | 9/1978 | Guimarin |
| 4,277,991 A | 7/1981 | Stubenrauch |
| 4,333,357 A | 6/1982 | Vinther |
| 4,542,668 A | 9/1985 | Wiener |
| 4,724,730 A | 2/1988 | Mader et al. |
| 4,770,070 A | 9/1988 | Sowers |
| 4,793,225 A | 12/1988 | Berkich |
| 4,813,309 A | 3/1989 | Kang |
| 4,847,997 A | 7/1989 | Petty |
| 4,858,316 A | 8/1989 | Dubey |
| 5,033,153 A | 7/1991 | Post |
| 5,067,376 A | 11/1991 | Fossella |
| 5,076,121 A | 12/1991 | Fossella |
| 5,090,273 A | 2/1992 | Fossella |
| 5,095,782 A | 3/1992 | Galea |
| 5,206,996 A | 5/1993 | McDaniel |
| 5,207,129 A | 5/1993 | Fosella |
| 5,235,878 A | 8/1993 | Young |
| 5,249,487 A | 10/1993 | Armfield |
| 5,249,490 A * | 10/1993 | Kennel ............................ 81/405 |
| 5,261,263 A | 11/1993 | Whitesell |
| 5,305,670 A | 4/1994 | Fossella et al. |
| 5,345,682 A | 9/1994 | Dubinsky et al. |
| 5,375,309 A | 12/1994 | Dunn |
| 5,377,566 A | 1/1995 | Mandigo |
| 5,448,931 A | 9/1995 | Fosella |
| 5,515,609 A | 5/1996 | Sperti |
| 5,531,549 A | 7/1996 | Fosella |
| 5,557,993 A | 9/1996 | Austin |
| 5,581,886 A | 12/1996 | Sesser et al. |
| 5,809,852 A | 9/1998 | Haskell |
| 5,819,607 A | 10/1998 | Carnesi |
| 5,893,306 A | 4/1999 | Owoc |
| 5,894,768 A | 4/1999 | Malkin et al. |
| 5,907,906 A | 6/1999 | Sweeney |
| 5,918,511 A | 7/1999 | Sabbaghian et al. |
| 5,960,683 A | 10/1999 | Malkin et al. |
| 6,073,522 A | 6/2000 | Carnesi |
| 6,098,506 A | 8/2000 | Clegg |
| 6,164,107 A | 12/2000 | Korba, Jr. |
| 6,186,034 B1 | 2/2001 | Lamons |
| 6,227,076 B1 | 5/2001 | Murray |
| 6,279,429 B1 | 8/2001 | Boyer |
| 6,314,842 B1 | 11/2001 | Hsieh |
| 6,341,544 B1 | 1/2002 | Falzone |
| 6,401,340 B1 | 6/2002 | King |
| 6,418,820 B1 | 7/2002 | Lamond et al. |
| 6,530,298 B1 | 3/2003 | Steffe |
| 6,658,739 B1 | 12/2003 | Huang |
| 6,751,867 B1 | 6/2004 | Whyte |
| 6,834,569 B2 | 12/2004 | Wang |
| 2002/0144575 A1 | 10/2002 | Niven |
| 2003/0121376 A1 | 7/2003 | Huang |
| 2004/0025647 A1 | 2/2004 | Wang |
| 2006/0225538 A1 | 10/2006 | Brown |

FOREIGN PATENT DOCUMENTS

| | | |
|---|---|---|
| DE | 2801881 | 7/1979 |
| EP | 0543815 B1 | 1/2000 |
| GB | 2265891 A | 10/1993 |
| JP | S5087599 | 12/1948 |
| JP | S5630511 | 8/1954 |
| JP | S57181516 | 5/1956 |
| JP | 2001286955 | 10/2001 |

OTHER PUBLICATIONS

European Patent Office, Supplementary European Search Report issued in connection with Patent Application No. EP06749895, mailed Aug. 17, 2010, 1 page.

First Examination Report dated Sep. 7, 2011 issued in Application No. 2116/KOLNP/2006, 1 page.

Nagel, Matthew. Examination Report for New Zealand Patent Application No. 562104. Aug. 7, 2009, Intellectual Property Office of New Zealand.

European Patent Office. Supplementary Search Report cited in EP Application No. 05 72 2450. Jun. 21, 2007.

* cited by examiner

ADJUSTABLE GRIPPING TOOL

RELATED APPLICATIONS

This application is a continuation-in-part of and claims the benefit of and priority from U.S. application Ser. No. 11/102,966, filed Apr. 11, 2005 and is hereby fully incorporated herein by reference, which is a continuation-in-part of and claims the benefit of and priority from U.S. application Ser. No. 10/763,489, filed Jan. 23, 2004, now issued as U.S. Pat. No. 6,889,579 on May 10, 2005, and is hereby fully incorporated herein by reference.

BACKGROUND

This disclosure pertains to a hand tool and more particularly, to an adjustable gripping tool which, as a result of manual operation, self-energizes, automatically configures to engage differently dimensioned and shaped work pieces and de-energizes upon release of actuating force.

Various types of adjustable gripping tools are known in the art. Specifically, several known adjustable gripping tools are embodied in the form of a "crescent" wrench, an adjustable socket wrench, an adjustable hydrant wrench, pipe wrench, vice grips, crimpers, bolt and nut cutters, pipe and tube cutters, and various other "plier-type" gripping tools. The adjustable hydrant wrench includes a housing having the same general shape as a hydrant fastener and a handle that is threadingly adjustable with the housing to compensate for differently sized hydrant fasteners. During the last 100 plus years, municipalities installed fire hydrants having pentagonal-shaped (five sided) fastener sizes that range between 1¼" and 1¾", because for the longest time there was no national standard for hydrant design or specification. Accordingly, most cities must contend with the legacy issues of these various designs. Other issues that are presented include old and aging metal and worn hydrant fasteners as a result of using an incorrect or improper wrench on corroded or frozen nuts. Major disadvantages of existing hydrant wrenches are that they do not fully engage the hydrant fasteners and require manual manipulation to threadingly adjust and lock down on the hydrant fastener prior to applying leverage to the hydrant fastener.

Therefore, there exists a need in the art for an adjustable gripping tool that, as a result of manual operation, self-energizes the tool gripping action, may be automatically sized and resized to engage a work piece, de-energizes upon release of actuation force, that has a broad range of dimensional capability, engages work pieces axially and radially and provides offsetting forces for stability in operation. Beyond the ability to resize the gripping range, the gripping tool of the present disclosure symmetrically translates the force applied to the gripping tool onto the work piece in a symmetrically balanced and mechanically advantaged and efficient way. Thus, an even distribution of gripping and rotational force about the work piece is achieved; thereby allowing for the most efficient distribution of mechanical force about the work piece. For any given force required to manipulate the work pieces, the gripping tool of the present disclosure will accomplish the work with the minimal distortion or deformation under load of the work piece by distributing the work force over the largest area of the work piece. Other advantages of the adjustable gripping tool of the present disclosure include decreased costs, increased productivity and multi-access engagement of the work piece resulting in a mechanically advantaged, efficient, even and balanced distribution of working forces.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION OF A PREFERRED EMBODIMENT OF THE DISCLOSURE

Figure 1:
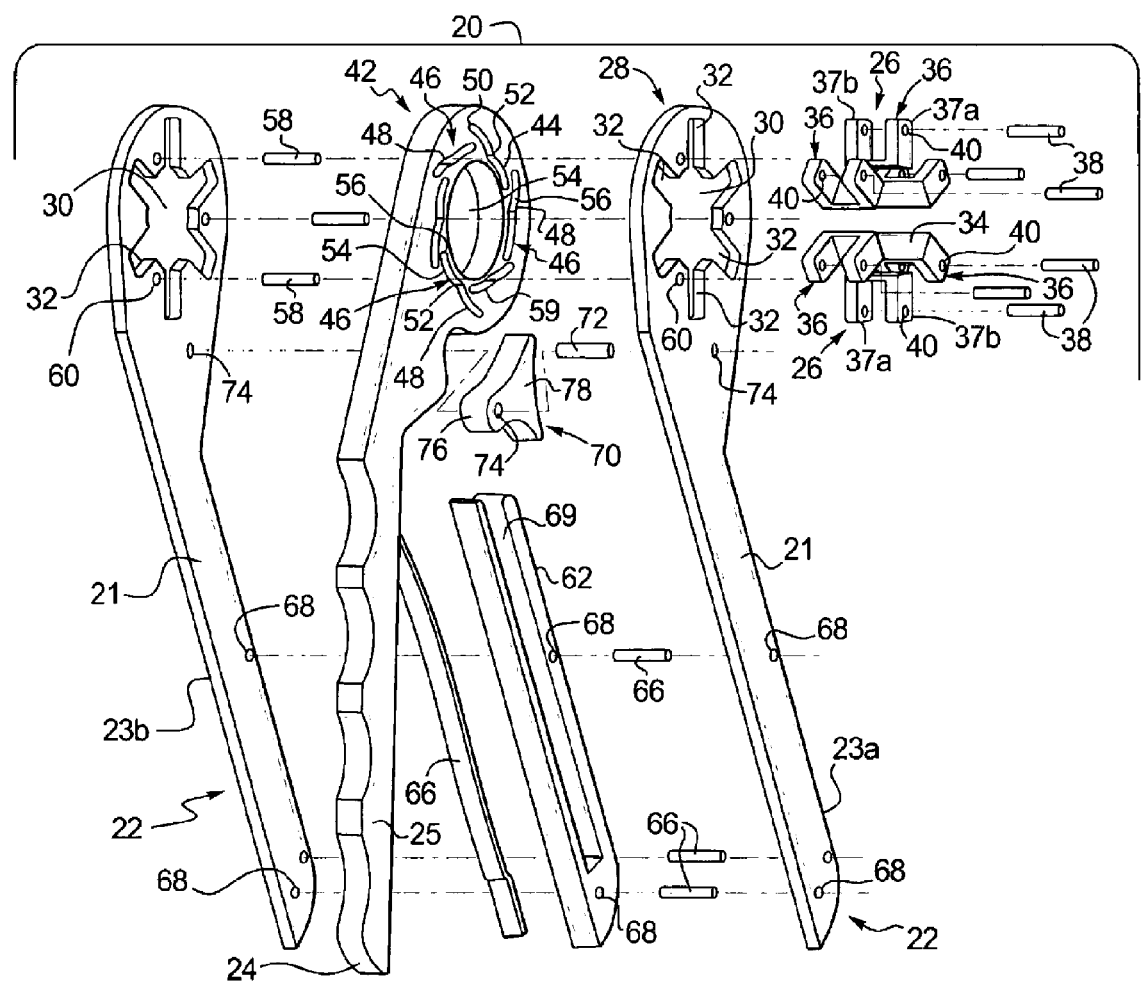
FIG. 1 is an exploded perspective view of an adjustable gripping tool in accordance with the principles of the disclosure set forth in U.S. Pat. No. 6,889,579, which is incorporated herein by reference.

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

One principal aspect of the present disclosure is directed to an adjustable gripping tool for engaging a work piece to impart work thereto. The gripping tool includes a first element and a second element disposed for relative movement to generate movement of at least one gripping element. The first element includes a handle and a gripping portion movably connected to the handle and adapted to engage the work piece. The handle includes a first end that operatively engages the second element. The gripping portion includes at least one guide and at least one gripping element. Each gripping element may include a body portion adapted for engaging the work piece, an arm portion configured to engage one of the guides and/or a force transfer element contiguous with the arm portion. The second element includes an actuation portion having at least one slot. Each slot has a section configured to engage one of the force transfer elements such that movement of the second element with respect to the first element actuates each at least one section to contact and move each respective force transfer element thereby actuating each gripping element along the respective guide.

FIG. 1 illustrates in an exploded perspective view of the adjustable gripping tool 20 in accordance with principles of the disclosure set forth in U.S. Pat. No. 6,889,579, which is incorporated herein by reference. No further description of the tool 20 will be set forth herein for the sake of brevity.

Similar structural and functional aspects may be repeated herein to describe this present disclosure.

Figure 2:
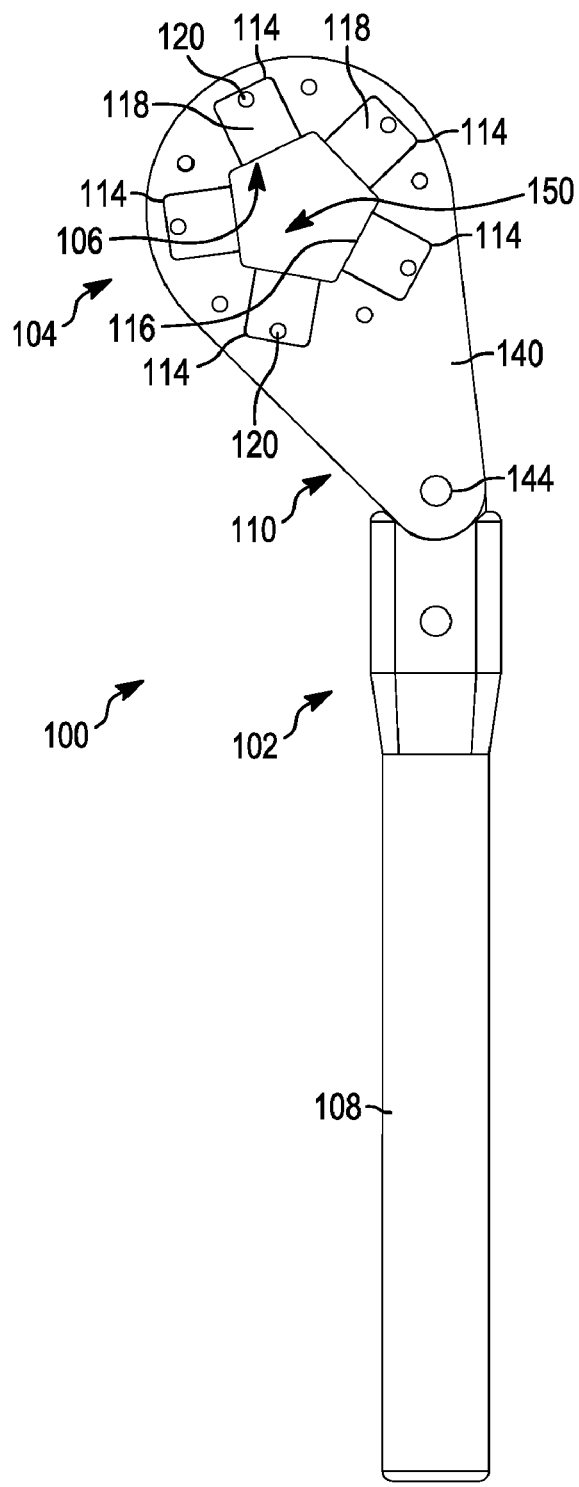
FIG. 2 is a top plan view of an adjustable gripping tool in accordance with the principles of the present disclosure.

FIG. 2 illustrates a top plan view of an adjustable gripping tool 100 in accordance with the principles of the present disclosure. The adjustable gripping tool 100 primarily includes a first element 102 and a second element 104 disposed for relative movement there between in order to generate movement of at least one gripping element 106. In one embodiment of the present disclosure, the first element 102 includes a handle 108 and a gripping portion 110 that is movably connected to the handle. The gripping portion 110 is adapted to engage a work piece as will be described in more detail below.

The handle 108 includes a first end 112 that operatively engages the second element 104. The gripping portion 110 includes at least one guide 114 defined therein and the at least one gripping element 106.

Each gripping element 106 preferably includes a body portion 116 that is adapted for engaging the work piece (as will be discussed in more detail below). Each gripping element 106 may also include an arm portion 118 configured to engage a respective guide 114 and may also further include a force transfer element 120 that is contiguous with the arm portion 118.

It is within the teachings of the present disclosure that the guides 114 may be formed in any suitable configuration. For example, the guides may be formed as groves, channels or any other suitable configuration. Not by way of limitation, but such structural configuration is often guided by manufacturing methods or capabilities. Additionally, the guides 114 may be curvilinear or linear. It is within the teachings of the present disclosure that the gripping elements may be integrally formed in any suitable manner. It will also be recognized that the gripping elements may be formed in any other suitable manner as desired to achieve any intended purpose or function.

It is within the teachings of the present disclosure that the gripping elements may have a smooth or rough face with which to engage the work piece, as desired. For example, the rough face may have a grooved, serrated, checked or any other suitable finish. Furthermore, the force transfer elements 120 may be configured as pins or other suitable structure to provide the functions as described herein. It will be recognized by those of skill in the art that the terms used herein are not of a limiting sense. Rather, these terms are used to broadly describe the structure and function herein.

Figure 3:
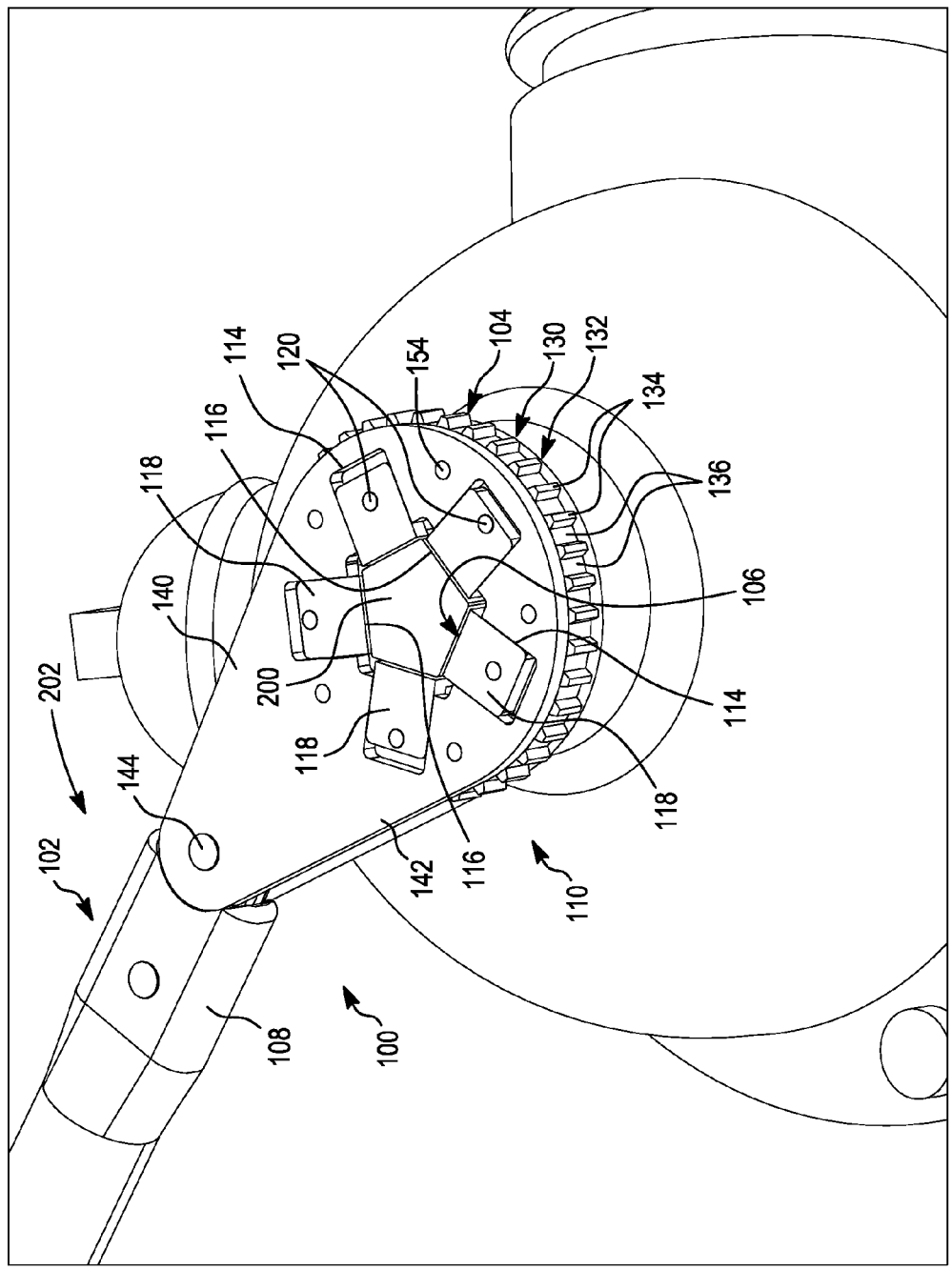
FIG. 3 is a perspective view of the adjustable gripping tool of FIG. 2 engaging a work piece to impart work thereto.

FIG. 3 is a perspective view of the adjustable gripping tool 100 of FIG. 2 engaging a work piece 200 to impart work thereto. In this embodiment, the work piece is a pentagonal-shaped hydrant fastener. It will be recognized by those of ordinary skill in the art that the gripping tool of the present disclosure may be configured in accordance with the principles of the structure and function disclosed herein to likewise engage any other differently shaped work piece, regardless of the number of sides or flats. As discussed above and illustrated in this FIG. 3, the gripping tool 100 of this embodiment includes a first element 102 and a second element 104 disposed for relative movement to generate movement of the gripping elements 106 (as will be discussed in more detail below). The first element 102 includes a handle 108 and a gripping portion 110 that is movably connected to the handle 108. Preferably, the gripping portion 110 includes a pair of plates 140, 142 disposed on opposite sides of the handle 108 and each plate is pivotally connected at 144 to the handle 108. It will be recognized by those of ordinary skill in the art that other suitable forms of connection between the handle 108 and gripping portion 110 may be used to achieve the same function. In this embodiment, the second element 104 is disposed between the pair of plates 140, 142. Alignment pins 154 may be used to maintain proper alignment of the second element 104 with respect to the plates 140, 142 and the handle 108. In this FIG. 3, the handle 108 has been moved relative to the gripping portion 110 in the direction indicated by arrow 202. As a result, the second element 104 has likewise been moved (as will be described in more detail below) with respect to the first element 102 so as to move each respective force transfer element 120 and the corresponding gripping element 106 to which the force transfer element 120 is contiguous with the arm portion 118 so that the body portion 116 is contiguous with the work piece 200 so that work may be imparted thereto by further movement of the handle 108 in the direction of arrow 202. The guides 114 ensure that the gripping elements 106 are moved along the intended path (in this embodiment radial with respect to the first opening 150 provided in the gripping portion 110). It will be recognized by those of ordinary skill in the art that the guide 114 may take any desired shape that corresponds with the arm portion 118 of the gripping element 106 in order to provide the same function. Further, those of ordinary skill in the art will recognize that the embodiment described in this disclosure is directed to an adjustable gripping tool 100 having a five-sided opening with five gripping elements 106 and that any suitably shaped opening and number of gripping elements may be provided in order to provide the intended function.

In this embodiment, the second element 104 includes a grasping portion 128 formed on an outer perimeter 130 thereof. The grasping portion 128 includes a crenate configuration 132. In this embodiment, the crenate configuration 132 is characterized by a series of teeth 134 and grooves 136. It will be recognized by those of ordinary skill in the art that such teeth and grooves may be configured in a suitable manner or shape in order to achieve the desired function, i.e., meshing engagement for transfer of applied force. Moreover, the shape of the teeth and grooves are preferably complimentary but are not limited as shown.

Figure 4:
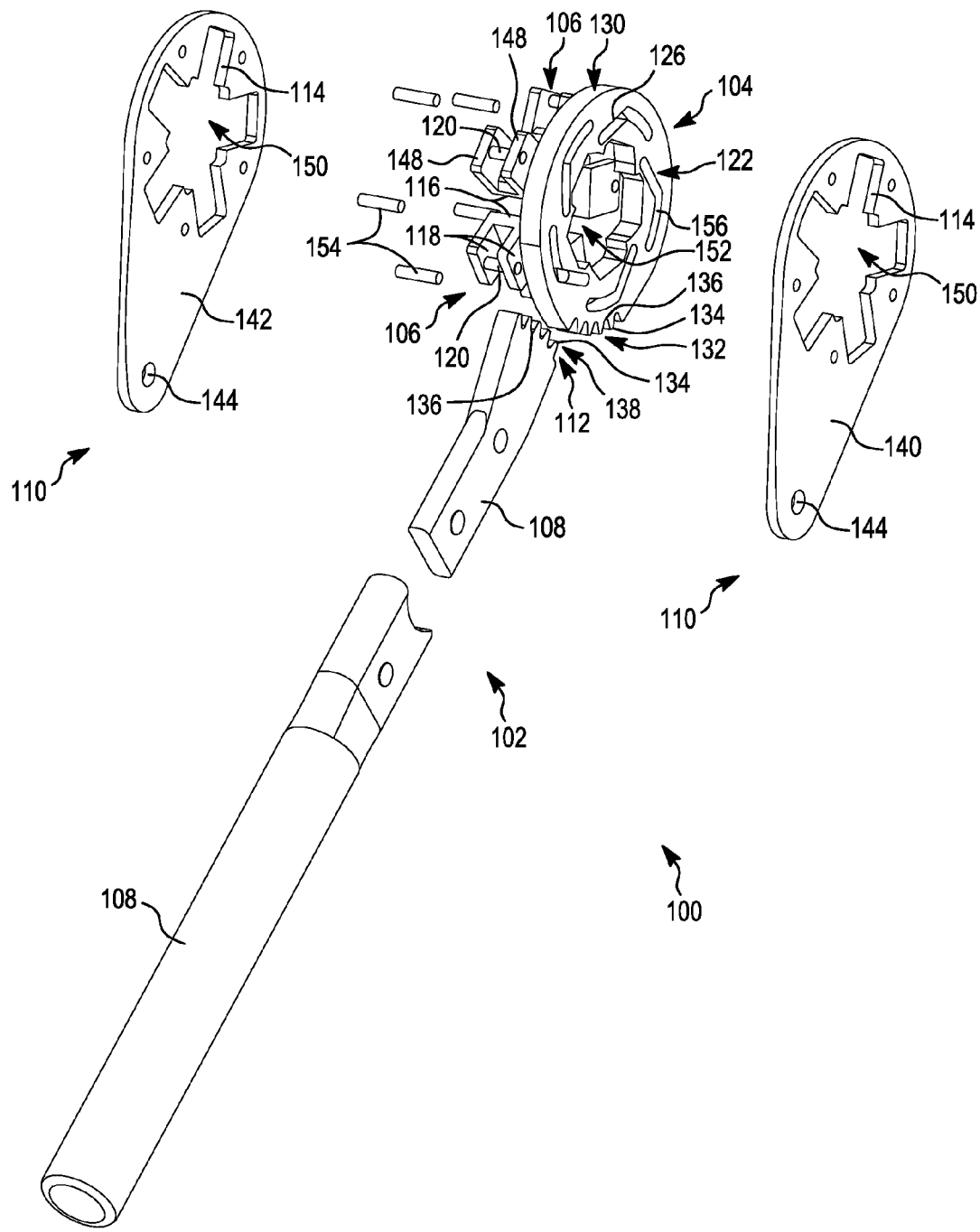
FIG. 4 is an exploded perspective view of the adjustable gripping tool of FIG. 2.

FIG. 4 is an exploded perspective view of the adjustable gripping tool 100 of FIG. 2. In this FIG. 4, the first element 102 and second element 104 are disposed for relative movement to generate movement of at least one gripping element 106. The first element 102 includes a handle 108 and a gripping portion 110 that is movably connected to the handle at pivot point 144, as described above. The handle includes a first end 112 that operatively engages the second element 104. In one embodiment, the first end 112 includes a crenate section 138 for meshing engagement with a complimentary crenate configuration 132 of the grasping portion 128. As discussed above with respect to the crenate configuration 132, the crenate section 138 of the first end 112 is preferably defined by at least one tooth 134 and at least one groove 136. The crenate configuration 132 and crenate section 138 are configured for meshing engagement and accordingly have complimentary structure. It will be recognized by those of ordinary skill in the art that such teeth and grooves may be configured in a suitable manner or shape in order to achieve the desired function, i.e., meshing engagement for transfer of applied force. Moreover, the shape of the teeth and grooves are preferably complimentary but are not limited as shown. Additionally, one of ordinary skill in the art will recognize that the operative engagement between the handle 105 and second element 104 may have any suitable structure to provide the intended function and this disclosure is not so limited.

The second element 104, in one embodiment, includes an actuation portion 122 that has at least one slot 124 defined or formed therein. Each slot 124 has a first section 126 configured to engage the force transfer element 120 of the gripping element 106. In one embodiment, the arm portion 118 of a gripping element 106 further includes a pair of arms 146, 148 disposed at opposite ends of the body portion 116 such that the gripping elements 106 are substantially U-shaped. In such embodiment, the second element 104 and the actuation portion 122 thereof may be disposed between the pair of arms 146, 148 of the gripping elements 106.

As mentioned above, the first element 102 and second element 104 are disposed such that movement of the second element 104 with respect to the first element 102 actuates each at least one first section 126 to contact and move the respective force transfer element 120 thereby actuating the respective element 106 along a respective guide 114 into engagement with the work piece (as shown above) to impart work thereto. As mentioned above, alignment pins 154 are connected to each of the plates 140, 142 of the gripping portion 110 and are disposed in a second section 156 of each slot 124 so that the second opening 152 of the actuation portion 122 remains generally concentrically aligned with the first opening 150 of the gripping portion 110 when the crenate section 138 of the first end 112 meshingly engages the crenate configuration 132 of the second element 104 in order to transfer force thereto and subsequently to the force transfer element 120 and finally the gripping elements 106 as a result of movement of the handle 108 with respect to the second elements 104. Each slot 124 is disposed adjacent to the second opening 152 and external thereto.

Figure 5:
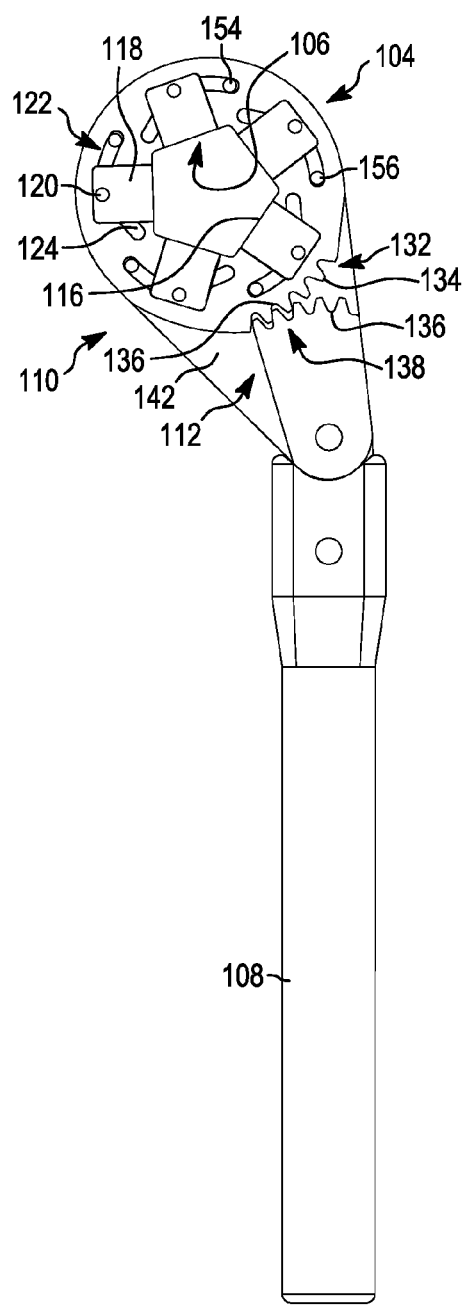
FIG. 5 is a sectioned view of the adjustable gripping tool of FIG. 2 wherein one element of a gripping portion and a portion of a handle have been removed, and gripping elements are not actuated.

FIG. 5 is a sectioned view of the adjustable gripping tool 100 of FIG. 2, wherein one element of the gripping portion 110 and a portion of the handle 108 have been removed for clarity, and the gripping elements 106 are not actuated. In this embodiment, the meshing engagement of the first end 112 and the second element 104 is clearly illustrated, but this disclosure is not limited to what is shown. The crenate configuration 132 that is formed on an outer perimeter 130 of the grasping portion 128 includes a series of teeth 134 and grooves 136. The crenate section 138 formed on the first end 112 likewise includes a series of teeth 134 and grooves 136. The teeth 134 and grooves 136 on both the second element 104 and first end 112 are configured complimentary for meshing engagement of the crenate configuration 132 and crenate section 138. It will be recognized by one of ordinary skill in the art that the crenate configuration 132 need not be disposed about the entire outer perimeter 130 and may in fact be disposed only adjacent the crenate section 138 to provide the intended function disclosed herein. The force transfer elements 120 are illustrated as disposed in the first section 126 of the slot 124 in the actuation portion 122 because the handle 108 has not been moved relative to the second element 104. The alignment pins 154 are disposed in the second section 156 of the slot 124. In this embodiment, the arm portion 118 includes a pair of arms 146, 148 disposed at opposite ends of the body portion 116 such that the gripping elements 106 are substantially U-shaped. The second element 104 is disposed between the pair of arms 146, 148.

Figure 6:
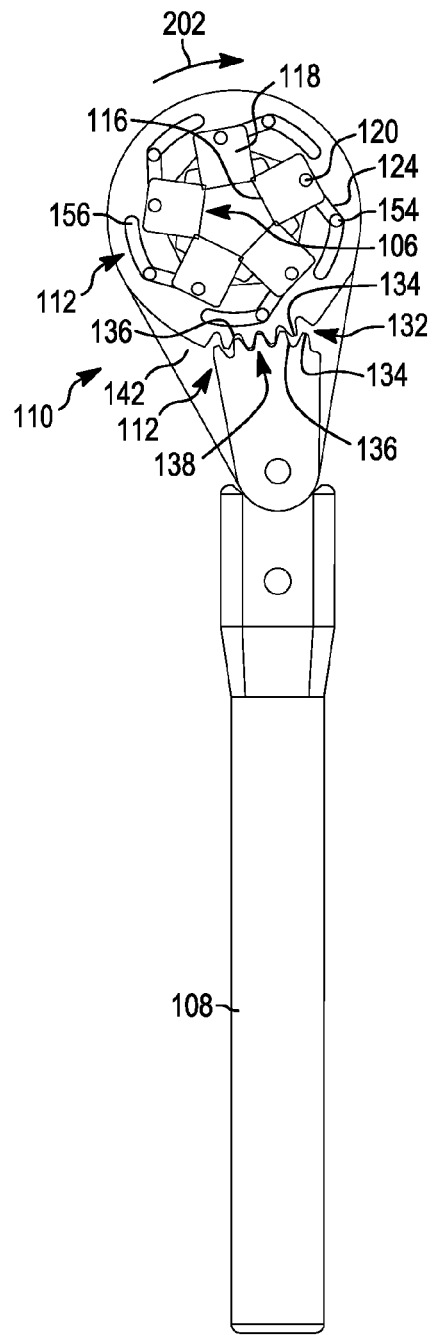
FIG. 6 is a sectioned view of the adjustable gripping tool of FIG. 2 wherein one element of the gripping portion and a portion of the handle have been removed, and gripping elements are actuated as a result of relative movement between the handle and a second element.

FIG. 6 is a sectioned view of the adjustable gripping tool 100 of FIG. 2, wherein one element of the gripping portion 110 and a portion of the handle 108 have been removed, and gripping elements 106 are actuated as a result of relative movement between the handle 108 and the second element 104. Movement of the second element 104 with respect to the first element 102 actuates each at least one first section 126 of a slot 124 to contact and move the respective force transfer element 120 thereby actuating each gripping element 106 along the respective guide 114. Consequently, the body portion 116 of each gripping element 106 is disposed in the first opening 150 from which the guides 114 radially extend, in order to engage an object disposed therein (e.g., such as a work piece as described above).

It will be recognized by those of skill in the art that the first and second openings 150, 152 need not be precisely concentric in order to operate as disclosed and provided the intended function. Rather, references to concentric alignment shall include any alignment of the first and second openings 150, 152 that permits operation as disclosed. It will be recognized by those of skill in the art that in this embodiment the first sections 126 define a path which generally decreases in terms of radial measurement from a center of the second opening 152 from an outer end to an inner end. Alternatively, the guides, slots and force transfer element may be configured to interact in a number of different ways to move the actuation elements into movement with the gripping or work piece engaging elements.

In one embodiment, each of the slots 124 further includes a second section 156 extending from the first section 126. It will be recognized by those of skill in the art that the second section 156 defines a path which is generally consistent in terms of radial measurement from the center of the second opening 152 from the inner end to an outer end.

In one embodiment of the present disclosure, the first element 102 further includes a plurality of alignment pins 154 for engaging the second sections 156. Each alignment pin 154 is disposed between an adjacent pair of guides 114 and extends parallel to the force transfer element 120. Apertures are formed in the plates 140, 142 to receive and engage the alignment pins 154. In operation, each one of the alignment pins 154 engages one of the second sections 156 so that during relative movement between the first element 102 and the second element 104, the first and second openings 150, 152 remain generally aligned. It will be recognized by those of skill in the art that the second sections 156 engage the alignment pins 154 in response to the forces induced by the divergent path of the first sections 126 on the force transfer elements 120. As a result, not only do the first and second openings 150, 152 remain generally concentrically aligned, but the gripping elements 106 are actuated along the guides 114 with equal, likewise displacement.

In one embodiment of the present disclosure, the gripping portion 110 includes five gripping elements 106. However, it would be recognized by those of skill in the art, that the gripping portion 110 need include only at least one gripping or engaging element 106 and that any other suitable number of gripping or work piece engaging elements may be provided. In the embodiment with five gripping elements, the adjustable gripping tool may be advantageously used in connection with pentagonal-shaped work pieces where the gripping elements face-load each of the flats of the work piece. Such a configuration is advantageous compared to conventional tools that point-load a pentagonal-shaped fastener at its corners.

This disclosure is not limited to the details of the apparatus depicted and other modification and applications may be contemplated. For example, the force transfer elements and alignment pins may be changed as desired for other like bearing elements. The gripping elements themselves may be varied in size, shape, surface finish, body configuration, arm configuration or quantity. Also, the size, shape and position of the openings may be altered as desired to suit particular applications. Further, the first and second elements, gripping elements and other components of the various embodiments of the gripping tool described above may be formed from any suitable material, including without limitation, metal, plastic, composite, natural, synthetic or any other material. Certain other changes may be made in the above-described apparatus without departing from true spirit and scope of the disclosure here involved. It is intended, therefor that the subject matter of the above depiction shall be interpreted as illustrated and not in a limiting sense. The actual scope of the disclosure is intended to be defined in the following claims when viewed in their proper perspective based on the related art.

What is claimed is:

1. An adjustable gripping tool for engaging a work piece to impart work thereto, the tool comprising:
    a first element and a second element disposed for relative movement to generate movement of at least one gripping element;
    the first element including a handle and a gripping portion that is movably connected to the handle and adapted to engage the work piece, the handle including a first end that operatively engages the second element and the gripping portion including at least one guide defined therein and said at least one gripping element;
    each said at least one gripping element including a body portion adapted for engaging the work piece, an arm portion configured to engage one said at least one guide and a force transfer element contiguous with the arm portion;
    the second element including an actuation portion having at least one slot therein, each said at least one slot having a first section configured to engage the force transfer element of one said at least one gripping element, such that movement of the second element with respect to the first element actuates each at least one first section to contact and move each respective force transfer element thereby actuating each said at least one gripping element along respective said at least one guide.

2. The tool as recited in claim 1, wherein the first end and the second element are disposed in meshing engagement.

3. The gripping tool as recited in claim 2, wherein the meshing engagement is defined by cooperative contact between at least one tooth and at least one groove.

4. The tool as recited in claim 1, wherein the second element includes a grasping portion formed on an outer perimeter thereof.

5. The tool as recited in claim 4, wherein the grasping portion includes a crenate configuration.

6. The tool as recited in claim 5, wherein the first end includes a crenate section for meshing engagement with the complementary crenate configuration of the grasping portion.

7. The tool as recited in claim 1, wherein the gripping portion includes a pair of plates disposed on opposed sides of the handle and each pivotally connected to the handle.

8. The tool as recited in claim 7, wherein the second element is disposed between the pair of plates.

9. The tool as recited in claim 1, wherein the arm portion of the gripping elements further includes a pair of arms disposed at opposite ends of the body portion such that the gripping elements are substantially U-shaped.

10. The tool as recited in claim 9, wherein the second element is disposed between the pair of arms.

11. The gripping tool as recited in claim 1, wherein the gripping portion includes a first opening from which the guides extend.

12. The gripping tool as recited in claim 11, wherein the actuation portion includes a second opening such that each said at least one slot is disposed adjacent the second opening external thereto.

13. The gripping tool as recited in claim 12, wherein the first opening and the second opening are generally concentrically aligned.

* * * * *